Jan. 11, 1944.  C. DE LANGE ET AL  2,338,907
BLOCKING LAYER CELL UNIT
Filed July 8, 1941
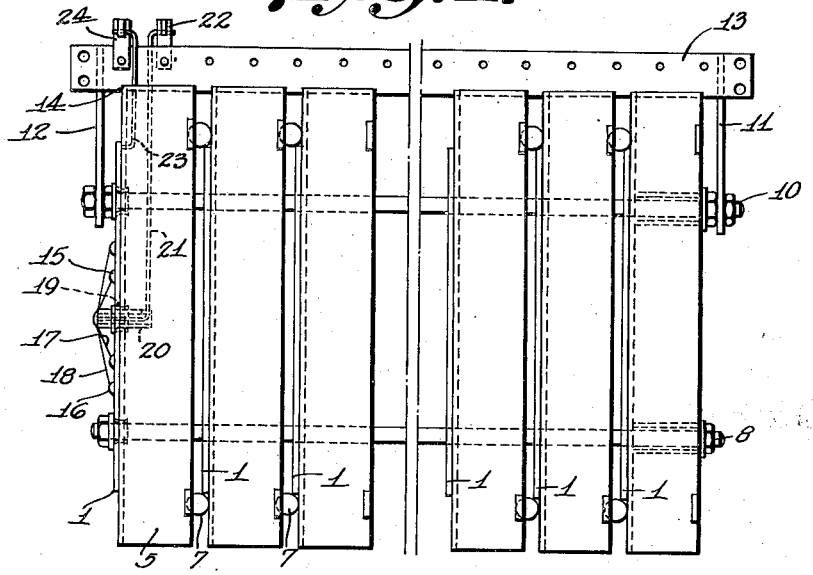
Fig. 1.
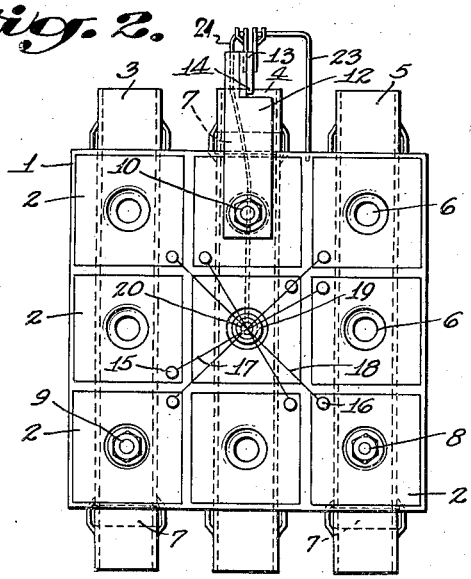
Fig. 2.
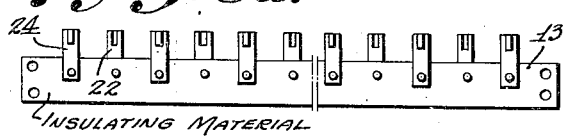
Fig. 3a.
Fig. 3b.
Inventors:
C. DE LANGE &
C. L. BOUCHER
By E. F. Hundroth
Attorney Patented Jan. 11, 1944

2,338,907

UNITED STATES PATENT OFFICE 2,338,907

BLOCKING LAYER CELL UNIT

Cornelis de Lange and Charles Louis Boucher, Eindhoven, Netherlands; vested in the Alien Property Custodian Application July 8, 1941, Serial No. 401,518
In the Netherlands July 17, 1940

5 Claims. (Cl. 175—366)

The invention relates to a blocking-layer cell unit, for example a rectifier, which is composed of a plurality of supporting plates which support the blocking-layer cells, cooling plates also being utilised.

In the case of a rectifier, for example, such rectifier units are built up from separate rectifier cells in order to be able to satisfy the electrical requirements for the rectifier as regards voltage and current intensity, by series or parallel connection or by combinations thereof.

According to a very common method the supporting plates on which the blocking layer cells are built up from the required layers, are perforated and slipped on a supporting bolt, the required cooling plates and contact strips and also insulating rings being interposed at the points where the electrodes of the various cells must remain insulated from one another. The contact strips lead in this case in different directions to the exterior of the unit where at some distance from one another the mutual electrical connections and the connections with the supply terminals are established. Sometimes part of these supply conductors are connected directly to the supporting plates on the cooling plates, for example by soldering. This method has the drawback that a rather large number of constituent parts is needed for the construction whilst the connections become involved and can frequently be provided only with difficulty.

According to the invention, these drawbacks are eliminated owing to the fact that the supply conductors for the electrodes of the blocking-layer cell are led to a contact bar provided outside the unit and supported by the latter.

In this case the contact bar consequently forms a separate member which is supported by the unit itself and which possesses, insulated from one another, all the connecting points; further, this member carries in its turn all the connecting elements for the electric circuit arrangement to be established.

In the preferred embodiment of the invention the supply conductors pertaining to a supporting plate and leading to the contact bar are directly mechanically connected to this supporting plate and are carried by the latter plate. The stored supporting plates with the blocking-layer cells provided thereon are consequently also provided with the supply conductors rigidly connected thereto and in assembling the rectifier unit it is only necessary to place the number of supporting plates required for the required output, in succession and to connect them mechanically whilst the supply conductors which are already present may be directly connected to the contact bar placed on the unit.

If a plurality of blocking-layer cells are present on each supporting plate, this principle is preferably also utilised by constituting the supply conductors for the electrodes located on the outside of these cells by wires which are all connected to a single wire which leads to the contact bar and which is mechanically connected to the supporting plate, for example, owing to its being clamped in an insulating sleeve which passes through an aperture of the supporting plate.

The invention will be explained more fully with reference to the accompanying drawing wherein Fig. 1 is a lateral elevation and Fig. 2 is a front elevation of a blocking-layer rectifier composed in accordance with the invention whilst Figs. 3a and 3b show separately a lateral elevation and an end-elevation of the contact bar respectively.

The rectifier consists of a plurality of blocking-layer plates 1, each plate carrying on one of its sides a selenium layer which constitutes the one electrode of nine rectifier cells which are obtained by applying by spraying a layer, acting as the counter-electrode, of an alloy of tin, bismuth and cadmium which has a melting point of about 100°. The latter layer is divided with the aid of a pattern into nine panes as may be seen from Fig. 2. Between the selenium electrode and the so-called counter-electrode produced from the alloy a blocking layer is formed in a known manner and thus nine separate rectifier cells are produced. The selenium electrode is not shown in the figures, the counter-electrodes 2 being shown only in Fig. 2. For the purpose of cooling each rectifier plate is provided with three U-shaped beams 3, 4 and 5 which are rigidly connected thereto. The rigid connection is obtained by providing flanged bushings in holes 6 of the supporting plate and in apertures of the U beams which correspond thereto. The rectifier plates provided with these U-beams are united, with the interposition of insulating spacing members 7, for example glass rods, to form stack-elements which are held together by means of tension rods 8, 9 and 10 which are passed through the holes of the previously mentioned flanged bushings.

On either side of the rectifier unit strips 11 and 12 extend from the connecting beam 10 upwards, said strips carrying a contact bar 13 of insulating material such as hard rubber, Bakelite or the like and which is placed on the tops of the U beams. By a plurality of notches as shown, for example, at 14, this contact bar engages corresponding notches in the bases of the U-beams, thus imparting rigidity to the assembly.

Each rectifier cell 2 is provided with a connecting wire which is connected to the counter electrode by means of a soldering contact as is shown, for example, at 15 and 16. The connecting wires, two of which are denoted by 17 and 18, lead to a central point of the supporting plate 1, in the present case the flanged bushing 19, which is provided with an insulating sleeve 20. At this point the various connecting wires are all soldered to the end of a wire 21 which is clamped in the insulating sleeve and which leads upwards to the exterior of the rectifier unit where it is connected to a contact strip 22 of the contact bar 13. To the supporting plate 1 is welded a wire 23 which is connected to a contact strip 24 of the contact bar, all the rectifier cells on the supporting plate being thus connected in parallel. The same occurs for the following rectifier plates and, as may be distinctly seen from Fig. 3, we thus obtain on the contact bar a plurality of contact strips with the aid of which all the connections desired may be established. In soldering the connecting wires use is made of soldering tags 25 which are shown in Fig. 3b. The contact strips which are to be interconnected, may all be bent over to the outside over an equal distance to be connected by means of a straight wire.

It is evident that this construction renders it possible to make the rectifier plates provided with the supply conductors connected thereto completely ready for use since these supply conductors are mechanically connected to the supporting plate and are of completely uniform construction. The supporting plates with the supply conductors constitute stack-elements which, when rectifiers have to be delivered, may be stacked up in the desired number with the interposition of the spacing members 7 whereupon the connecting bolts 8, 9, 10 and the contact bar 13 of corresponding length are provided and the supply conductors 21, 23, etc. are soldered on to the contact bar.

The number of components to be stored is very small and the rectifier units may be assembled in an extremely short time for greatly varying powers whilst the construction remains very surveyable and varying mutual connections of the rectifier elements may be established within a short time.

We wish it to be understood that we do not desire to be limited to the exact details of construction and design shown and described as various modifications within the scope of the appended claims may occur to a person skilled in the art.

What we claim is:

1. A blocking-layer rectifier assembly comprising a plurality of rectifier units, each of said units comprising a blocking-layer cell having an electrode, a counter-electrode, a supporting plate member, and a cooling member secured to the supporting plate, means securing the supporting plates of said rectifier units in spaced and insulating relationship, a terminal member of insulating material disposed adjacent to the units and supported thereby, a plurality of terminals secured to said terminal member at spaced points, and electrical conductors each connecting one of the electrodes of each cell to one of said terminals.

2. A blocking-layer rectifier assembly comprising a plurality of rectifier units, each of said units comprising a blocking-layer cell having an electrode, a counter-electrode, a supporting plate member electrically connected to said electrode and a cooling member secured to the supporting plate, means securing the supporting plates of said rectifier units in spaced and insulating relationship, a terminal member of insulating material disposed adjacent to the units and supported thereby, a plurality of terminals secured to said terminal member at spaced points, and electrical conductors each connecting the counter-electrode and the supporting plate member of each cell to one of said terminals, the conductors associated with each supporting plate member being mechanically connected to and supported by the said plate member.

3. A blocking-layer rectifier assembly comprising a plurality of rectifier units, each of said units comprising a plurality of blocking-layer cells arranged on a supporting plate member forming a common electrode for said cells, individual counter-electrodes for said cells, an insulting bushing secured to said supporting plate, individual wire elements connecting the counter-electrodes to said bushing, means securing the supporting plates of said rectifier units in spaced and insulating relationship, a terminal member of insulating material disposed adjacent to the units and supported thereby, a plurality of terminals secured to said terminal member at spaced points, and electrical conductors each connecting the bushings and the supporting plates to individual terminals.

4. A blocking-layer rectifier assembly comprising a plurality of rectifier units, each of said units comprising a blocking-layer cell having an electrode, a counter-electrode, a supporting plate member, and a cooling member secured to said supporting plate and extending beyond an edge thereof, means securing the supporting plates of said rectifier units in spaced and insulating relationship, a terminal member of insulating material disposed adjacent to the extending edge of the cooling plates and supported thereby, a plurality of terminals secured to said terminal member at spaced points, and electrical conductors each connecting one of the electrodes of each cell to one of said terminals.

5. A blocking-layer rectifier assembly comprising a plurality of rectifier units, each of said units comprising a blocking-layer cell having an electrode, a counter-electrode, a supporting plate member, and a cooling member secured to the supporting plate, means securing the supporting plates of said rectifier units in spaced and insulating relationship, a terminal member of insulating material disposed adjacent to the units and supported by said securing means, a plurality of terminals secured to said terminal member at spaced points, and electrical conductors each connecting one of the electrodes of each cell to one of said terminals.

CORNELIS DE LANGE.
CHARLES LOUIS BOUCHER.